United States Patent [19]

Streit

[11] Patent Number: 5,435,871
[45] Date of Patent: Jul. 25, 1995

[54] PROCESS FOR PRODUCING TUBULAR SHEATH SOUND INSULATION FOR ELECTRIC CABLES

[75] Inventor: Bernard Streit, Clerval, France

[73] Assignee: Sofanou S.A., Clerval, France

[21] Appl. No.: 12,594

[22] Filed: Feb. 4, 1993

[30] Foreign Application Priority Data

Feb. 12, 1992 [FR] France .................. 92 01793

[51] Int. Cl.⁶ .................. B26D 23/00; H02G 3/04
[52] U.S. Cl. .................. 156/201; 156/202; 156/215; 138/128; 174/68.3; 174/136
[58] Field of Search ............... 156/200, 201, 202, 215, 156/438, 461, 466; 174/68.3, 72 A, 136; 138/118.1, 125, 128, 141, 151, 156, 164; 428/35.2, 36.91, 36.5

[56] References Cited

U.S. PATENT DOCUMENTS

| | | | |
|---|---|---|---|
| 3,627,615 | 12/1971 | Guiles et al. | 156/466 |
| 4,270,963 | 6/1981 | Howat | 156/461 |
| 4,593,442 | 10/1986 | Wright et al. | |
| 4,899,414 | 2/1990 | Irwin | 174/136 |
| 4,970,351 | 11/1990 | Kirlin | 174/68.3 |
| 5,060,697 | 10/1991 | Weinheimer | 138/121 |

FOREIGN PATENT DOCUMENTS

| | | |
|---|---|---|
| 0152696 | 8/1985 | European Pat. Off. |
| 4006597 | 9/1991 | Germany |
| 3292487 | 12/1991 | Japan |
| 411785 | 2/1980 | Sweden |
| 1534279 | 11/1978 | United Kingdom |

*Primary Examiner*—Michael W. Ball
*Assistant Examiner*—Richard Crispino
*Attorney, Agent, or Firm*—Merchant & Gould Smith, Edell, Welter & Schmidt

[57] ABSTRACT

A tubular sheath made from plastic material used for the mechanical and/or thermal protection of electric cabling is wrapped in a strip of sound-insulating material, the lateral parts of which have been inserted inside the sheath through the slit. The width of the strip, preferably produced from felt, is substantially equal to the sum of the external and internal perimeters of the plastic sheath.

1 Claim, 2 Drawing Sheets

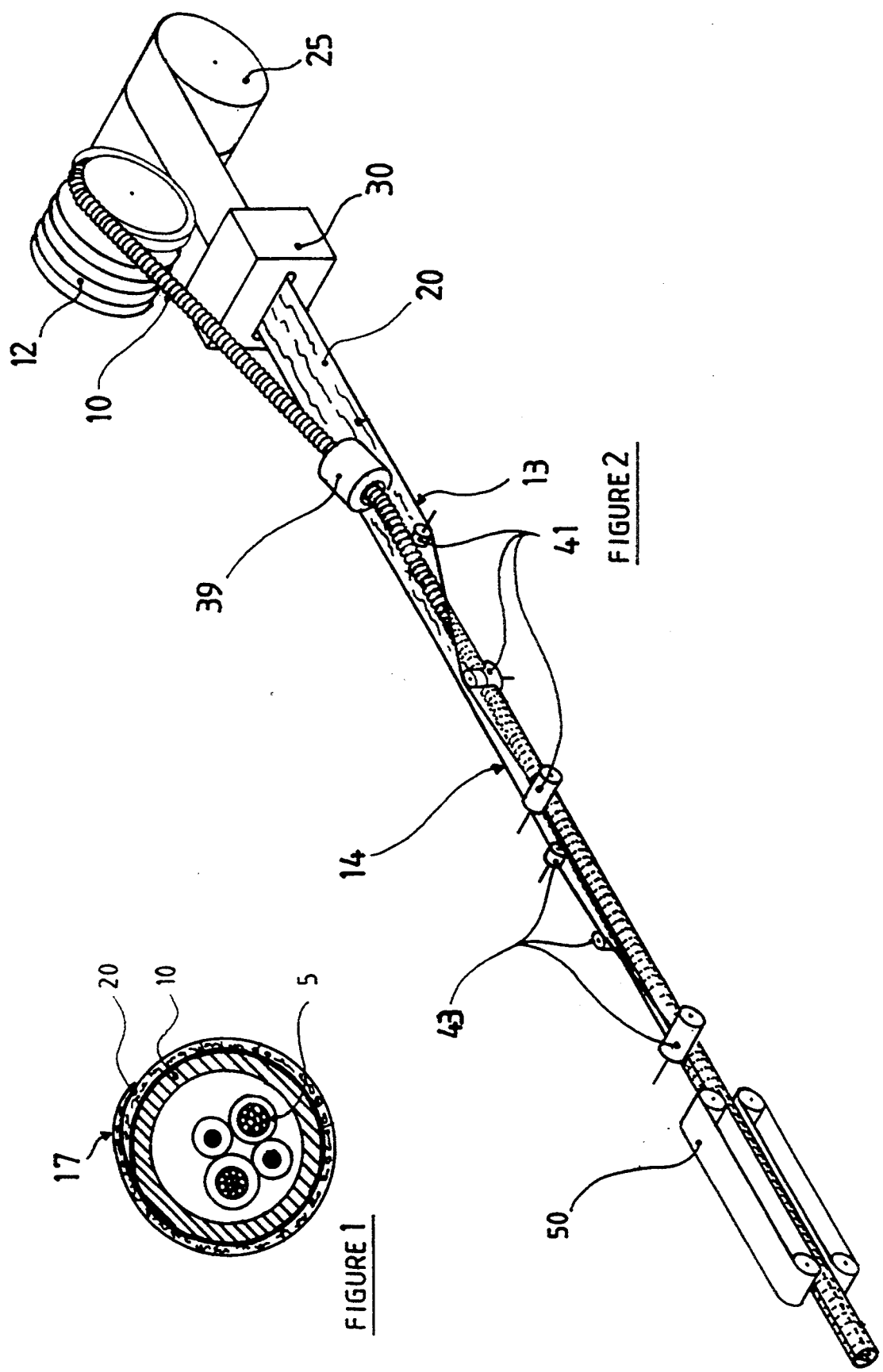

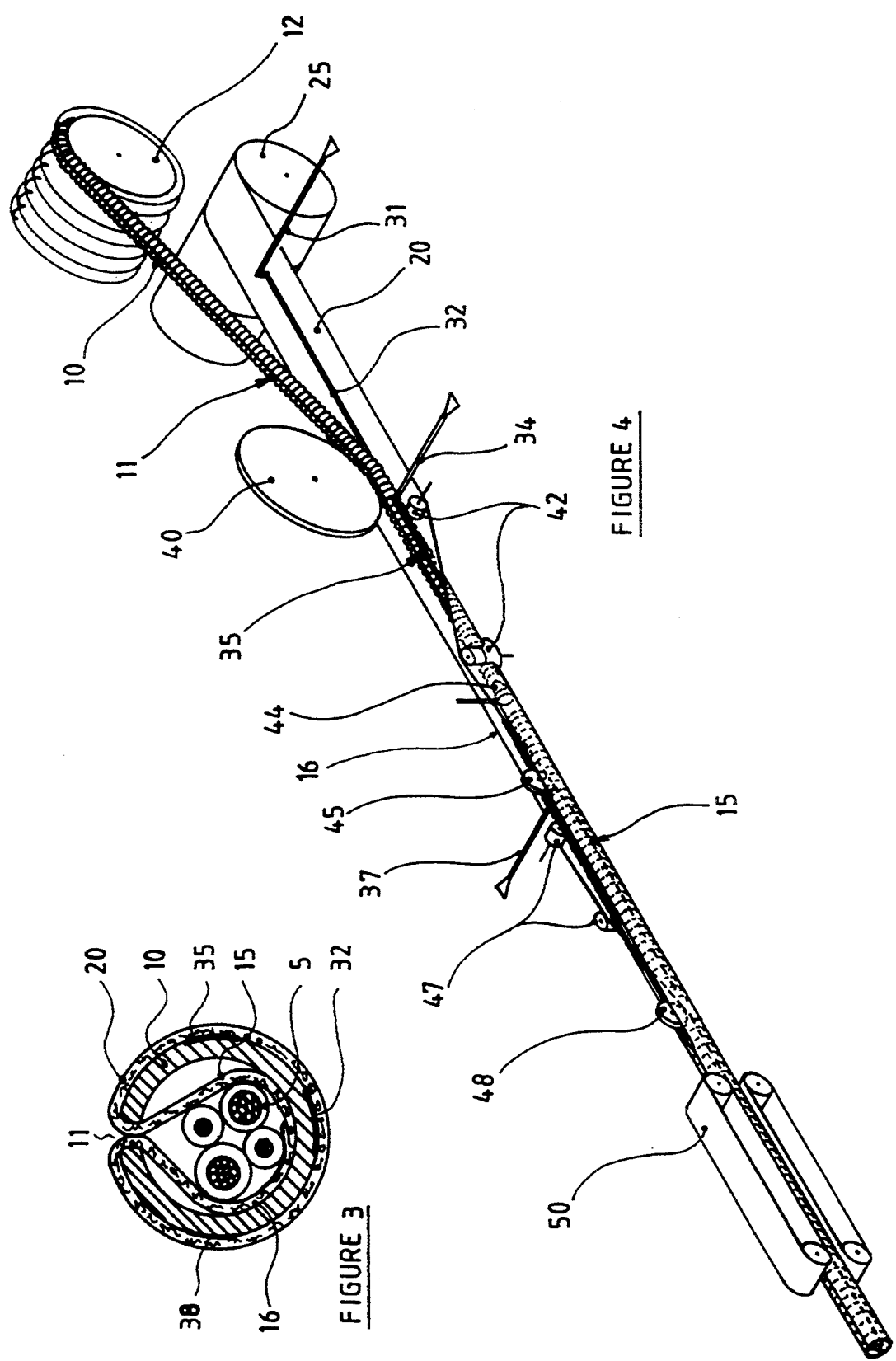

PROCESS FOR PRODUCING TUBULAR SHEATH SOUND INSULATION FOR ELECTRIC CABLES

TECHNICAL FIELD

The present invention relates to tubular protection sheaths for electric cables, and more particularly ringed plastic sheaths used in the installation of electric cabling inside motor cars.

BACKGROUND OF THE INVENTION

Ringed tubes, that is to say tubes whose form resembles a succession of rings connected to one another, are usually produced from plastic, such as extruded polypropylene. Such tubes enable complex protective sheath systems to be produced for electric wire or cable harnesses within a vehicle, such as a car or lorry, and particularly in the engine compartment. In fact, because of the small amount of space available, these sheaths or hoses have to be able to follow the non-rectilinear walls very closely and pass around the different components encountered. With such ringed sheaths it is just possible to produce curves with a radius of curvature less than three times their diameter without their deforming on the inside or even breaking.

Current developments in motor car technology, particularly in the domain of electrical accessories such as high-fidelity loudspeakers, rear screen wipers, etc, and in the continuous electronic monitoring of many parameters resulting in automatic commands, means that more and more electric cables pass through different bodywork components, such as doors or roof fittings, to reach the fascia for example. Moreover, particular efforts are currently made to improve the soundproofing of the passenger compartment, by systematically seeking out and eliminating all potential sources of noise. It has been found, however, that the vibration of cables harnesses inside sheaths, or of sheaths against wall members, may generate auditory nuisances.

BACKGROUND ART

Plastic sheaths are known which have coextruded thermal insulation or mechanical reinforcement layers added. However, the direct application of these coextrusion techniques to noise-reducing cellular foams would be much too complicated to be economically viable.

It is moreover also known that a plastic cable-protection sheath can be enclosed within a split tube made from flexible material which is fixed at regular intervals by means of adhesive strips. As an alternative, the Japanese document JP-57 085 874 discloses an adhesive band with the addition of fibrous material, directly used to grip cables together. As may easily be understood, the use of these products during the installation of cabled systems proves to be tedious and gives only a limited amount of noise protection.

DISCLOSURE OF THE INVENTION

The object of the present invention is a tubular sheath, preferably ringed, giving as before mechanical and thermal protection, but in addition effective sound insulation, and the structure of which is such that its method of manufacture is relatively simple. In particular this structure must afford a possibility of reworking in order to reduce the final cost of the product accordingly. It is moreover important that the design of the sheath should allow double sound insulation: that is to say both between the cable and the sheath and between the sheath and the wall member to which it is fixed. Finally, the use and installation of such ringed sheaths with sound insulation must remain just as simple and not require any special equipment as before.

These objects are achieved by means of a tubular sheath made from flexible plastic used for the protection of electric cabling because it is wrapped in a strip of sound-insulating material. This wrapping may advantageously be carried out, as required, by means of a reworking operation on sheaths produced in a standard manner, and this with relatively simple equipment.

According to one advantageous embodiment, a tubular plastic sheath split longitudinally is wrapped in a strip of sound-insulating material, the lateral parts of which have been inserted inside the said sheath through the slit, thus producing sound insulation against both its external surface and its internal surface. Advantageously then, the width of the strip is substantially equal to the sum of the external and internal perimeters of the plastic sheath.

The strip may consist of many sound-insulating materials such as expanded polyethylene foam, but it has proved particularly advantageous to use strips of felt, that is to say a material obtained by matting together natural or artificial hairs or fibres. A material which is particularly highly regarded is a strip of acrylic baize.

When a double-padded sheath is produced by the insertion of edges of the strip into the slit in the sheath, it has proved, after many tests in the workshop, that it was sufficient for the strip of sound-insulating material to be bonded to the external surface of the plastic sheath with only 2, 3 or 4 substantially equidistant parallel longitudinal lines of glue.

In addition to its noise-reducing qualities, the single sound-insulation sheath according to the invention is particularly advantageous in that its method of manufacture consists of:
  bringing in, in the flat state, a strip of sound-insulating material and depositing a layer of glue over its width,
  bringing in and applying to the top, at the centre, a plastic tubular sheath,
  folding over a first side of the strip against the plastic sheath,
  folding over the other side of the strip against the plastic sheath (10) and over the edge of the first side.

A device for implementing the method of the invention may therefore comprise:
  means for bringing in, in the flat state, a strip of sound-insulating material from a feed drum and a station for depositing glue over the width of the strip,
  means for bringing in and applying a tubular plastic sheath from a feed drum to the top centre of the strip,
  a first device for folding over a first side of the strip against the plastic sheath,
  followed by a second device folding over the other side of the strip against the plastic sheath and over the edge of the first side.

Advantageously, the method of manufacture of the double sound-insulation sheath according to the invention consists of:

bringing in, in the flat state, a strip of sound-insulating material and depositing a first line of glue at its middle, bringing in and applying to the top a split tubular plastic sheath, the slit being oriented towards the top, depositing a second line of glue on a first side of the sheath and then folding over the strip against the plastic sheath, opening up the slit and inserting the raised part of the strip under slight tension inside the plastic sheath, simultaneously or successively repeating the preceding operation for the lateral part of the strip situated on the other side of the plastic sheath.

A device for implementing the method of manufacture may therefore comprise:

means for bringing in, in the flat state, a strip of sound-insulating material from a feed drum and a first nozzle for depositing a first line of glue in the middle of the strip, means for bringing in and applying a split tubular plastic sheath from a feed drum to the top of the strip, the slit being oriented towards the top, a second nozzle depositing a second line of glue on a first side of the plastic sheath and a first device folding over the strip against the side of the plastic sheath, an opening pin opening up the top slit followed by a first vertical wheel inserting the lateral part of the strip under slight tension inside the sheath, a third nozzle depositing a third line of glue on the second side of the plastic sheath followed by a second device folding over the other side of the strip against the plastic sheath, followed by a second vertical wheel inserting the other lateral part of the strip under slight tension inside the sheath.

The device for folding over the strip of sound-insulating material may comprise a succession of wedges with increasing angles and/or a continuous guide and/or a roller mechanism.

Advantageously, the plastic sheath and the strip of sound-insulating material are principally drawn through the device by drawing means acting downstream on the wrapped sheath, notably a rubberised endless belt device.

BRIEF DESCRIPTION OF THE DRAWINGS

The invention will be understood better from an examination of one embodiment taken by way of example, in no way limitative, and represented in the following figures:

FIG. 1 is a diagrammatic view in cross section of a sheath according to a first embodiment of the invention, FIG. 2 is a view in diagrammatic perspective of a method of manufacture of the sheath of FIG. 1, FIG. 3 is a diagrammatic view in cross section of a sheath according to a second embodiment of the invention, FIG. 4 is a view in diagrammatic perspective of a method of manufacture of the sheath of FIG. 3.

DETAILED DESCRIPTION OF THE PREFERRED EMBODIMENT

According to the invention, a sound-protection sheath for electric cables is produced by reworking from a plastic ringed tubular sheath produced according to known methods and then stored on drums 12. Such a drum is initially installed at the feed to the device in FIG. 2. A second drum 25, loaded with a strip of baize 20, obtained commercially, is also installed at the feed to the device, in parallel to the first. The strip of baize 20 is first of all discharged flat and then passes into a station 30 for gluing it over the entire width of the face oriented upwards. Means represented by the guide 39 make it possible to bring in the plastic sheath 10 and apply it firmly against the glued face.

Immediately afterwards, a roller device illustrated diagrammatically under the reference number 41 lifts up the right-hand lateral part 13 of the strip of baize 20 vertically and then folds it over the top part of the sheath. As an alternative, the device for lifting up the strip against the sheath may consist of a series of wedges with increasing angles such as 45°, 67.5°, 90°, etc., or a tubular guide with a radius decreasing longitudinally.

After that, a second roller device illustrated diagrammatically under the reference number 43 lifts up the other left-hand lateral part 14 of the strip of baize 20 vertically and then also folds it over the top part of the sheath and over the edge of the first lateral part 13. However, a strip of baize 20 may also be envisaged with a width which is at least equal to the perimeter of the sheath, thus avoiding the overlap creating an extra thickness.

The sheath thus completed passes into a drawing device with rubberised endless belts 50 which thus provides, by traction, the main force necessary for the movement of the sheath 10 and strip 20 through the device. Obviously, this drawing device may also comprise a plurality of rubberised rollers, the profile of which would surround that of the sheath. Additional drawing means may be distributed along this manufacturing line: for example, motorised draw rollers may supplement the folding devices 41, 43.

As illustrated in FIG. 1, the product obtained thus comprises a plastic ringed tubular sheath 10 providing mechanical protection, this sheath being wrapped on the outside with a strip of baize 20, the edges of which optionally overlap at 17.

A second embodiment of the invention is illustrated in FIG. 4, in which similar parts bear identical reference numbers. In this embodiment, a first nozzle 31 deposits a first longitudinal median line of glue 32. Means represented symbolically by the disc 40 make it possible to bring in the plastic sheath 10 with its slit 11 oriented upwards and to apply it firmly against the first line of glue.

Immediately afterwards, a second nozzle 34 deposits a second line of glue 35 on one of the sides of the sheath, for example the right-hand one as illustrated in FIG. 4, and a roller device illustrated diagrammatically under the reference number 42 lifts up the right-hand lateral part of the strip of baize 20 vertically, thus already applying this strip against the lower quadrant of the sheath.

After that, an opening pin 44 passing through the slit parts it, which enables an insertion wheel 45 to insert the remainder of the right-hand lateral part of the strip inside the sheath under slight tension, which, at the same time, finishes applying the strip against the top right-hand quadrant of the sheath.

Simultaneously or thereafter, a third nozzle 37 deposits a second lateral line of glue on the other side of the sheath, in this case the left-hand side. Then a second roller device, shown diagrammatically under the reference number 47, or another device with the same function, lifts up the left-hand lateral part of the strip 20 against the sheath, bringing this part temporarily in a vertical position towards a second wheel 48 which inserts it inside the sheath. By this movement, this left-hand part has also been applied under slight tension against the left-hand external lateral surface, the remainder having been inserted inside.

As illustrated in FIG. 3, the product obtained then comprises a plastic ringed tubular sheath 10 providing mechanical protection, this sheath being wrapped on the outside in a strip of baize 20, which is continued on the inside by two lateral strips 15 and 16. As can be observed, this strip of baize is bonded solely to the external surface of the sheath by a few lines 32, 35, 38. In fact, it has proved that, when electric cables 5 are inserted in the sheath through the slit 11, these cables necessarily fall between the internal strips of baize 15 and 16, which they apply against the internal wall.

Preferably, the strip of sound-insulation material 20 is produced from baize made from acrylic fibres having good fire resistance. As an alternative, a strip of expanded polyethylene foam could also have been considered, such as the one sold under the name "NOPA FOAM" by the PSG Company.

As has been seen from a reading of this account, the method of producing this special anti-noise sheath may be effected by reworking, that is to say away from the machines extruding the initial plastic tube, which facilitates implementation and production management. The sheath obtained is particularly soundproofed in so far as the vibration is attenuated with regard to contact both between the cable and the sheath and between the sheath and the vehicle wall. Many improvements can be made to this anti-noise sheath and manufacturing device within the scope of this invention.

I claim:

1. A method of manufacturing a sound-insulating sheath made from flexible plastic, comprising the steps of:

providing a strip of sound-insulating felt, the strip being disposed in a flat position;

depositing a first line of glue over the strip;

applying a slit tubular plastic sheath to a center of a top surface of the strip, a slit of the slit tubular plastic sheath being oriented towards the top surface;

depositing a second line of glue on a first side of the slit tubular plastic sheath;

folding over a first side of the strip corresponding to the first side of the slit tubular plastic sheath against the slit tubular plastic sheath;

opening up the slit;

snapping a lateral part of the strip under a slight tension through the slit into the slit tubular plastic sheath to provide internal insulation; and successively repeating the preceding steps for the lateral part of the strip situated on a second side, opposite to the first side, of the slit tubular plastic sheath.

* * * * *